United States Patent
Ali et al.

(10) Patent No.: US 9,652,418 B2
(45) Date of Patent: May 16, 2017

(54) HIGH THROUGHPUT REGISTER FILE MEMORY WITH PIPELINE OF COMBINATIONAL LOGIC

(71) Applicant: Intel Corporation, Santa Clara, CA (US)

(72) Inventors: Shahid Ali, Bangalore (IN); Shivraj Dharne, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 368 days.

(21) Appl. No.: 14/320,591

(22) Filed: Jun. 30, 2014

(65) Prior Publication Data

US 2015/0378946 A1  Dec. 31, 2015

(51) Int. Cl.
| | |
|---|---|
| G06F 13/00 | (2006.01) |
| G06F 13/28 | (2006.01) |
| G06F 13/40 | (2006.01) |
| G06F 13/42 | (2006.01) |
| G06F 12/06 | (2006.01) |

(52) U.S. Cl.
CPC .......... *G06F 13/28* (2013.01); *G06F 13/4068* (2013.01); *G06F 13/4221* (2013.01); *G06F 12/06* (2013.01)

(58) Field of Classification Search
CPC ...... G06F 13/28; G06F 12/06; G06F 13/4068; G06F 13/4221

USPC .................................................. 710/308–310
See application file for complete search history.

(56) References Cited

U.S. PATENT DOCUMENTS

| | | | |
|---|---|---|---|
| 7,707,391 B2 | 4/2010 | Musoll et al. | |
| 8,837,205 B2* | 9/2014 | Pelley | G11C 11/413 365/154 |
| 8,880,855 B2 | 11/2014 | Anderson et al. | |
| 8,908,449 B1* | 12/2014 | Ramaraju | G11C 11/419 365/154 |
| 9,182,991 B2 | 11/2015 | Buyuktosunoglu et al. | |
| 9,201,654 B2 | 12/2015 | Cantin et al. | |
| 2009/0193231 A1 | 7/2009 | Gschwind et al. | |
| 2011/0320774 A1 | 12/2011 | Jacobi et al. | |
| 2014/0293682 A1* | 10/2014 | Shah | G11C 11/413 365/156 |
| 2015/0370574 A1 | 12/2015 | Jackson | |

* cited by examiner

*Primary Examiner* — Tammara Peyton
(74) *Attorney, Agent, or Firm* — Compass IP Law PC

(57) ABSTRACT

Pipelining is included inside a register file memory. A register file memory device includes a static bitcell, and pipelined combinational logic. The combinational logic pipeline couples the I/O (input/output) node to the static bitcell. The pipeline includes multiple stages, where each stage includes a static logic element and a register element, where the operation of each stage transfers data through to a subsequent stage. The number of stages can be different for a read than a write. The multiple stages perform the operations to execute the read or write request.

20 Claims, 7 Drawing Sheets

500

| HTRF BIT ARRAY 510 | PLFF 512 | ROW DEC 520 |
|---|---|---|
| PIPELINE FF 514 | LCTRL 540 | |
| LOCAL I/O 530 | | |
| HTRF BIT ARRAY 510 | PLFF 512 | ROW DEC 520 |
| PIPELINE FF 514 | LCTRL 540 | |
| LOCAL I/O 530 | | |
| HTRF BIT ARRAY 510 | PLFF 512 | ROW DEC 520 |
| PIPELINE FF 514 | LCTRL 540 | |
| LOCAL I/O 530 | | |
| HTRF BIT ARRAY 510 | PLFF 512 | ROW DEC 520 |
| PIPELINE FF 514 | LCTRL 540 | |
| LOCAL I/O 530 | | |
| GLOBAL I/O 550 | GCTRL 560 | |
| PIPELINE FF 554 | PLFF 552 | |

FIG. 5

HIGH THROUGHPUT REGISTER FILE MEMORY WITH PIPELINE OF COMBINATIONAL LOGIC

FIELD

Embodiments of the invention are generally related to memory systems, and embodiments are more particularly related to a high throughput register file memory.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2014, Intel Corporation, All Rights Reserved.

BACKGROUND

Modern computing and electronic devices rely on their processors performing massive numbers of operations per second to meet performance expectations. Central processing units (CPUs) and graphics processing units (GPUs) execute based on high frequency clock signals, and typically have multiple cores that each operate on different tasks at the same time. Thus, modern processors rely on multiprocessing and multitasking to perform work. For the processors to be productive with their multiprocessing and multitasking capabilities, computing systems continue to have higher expectations for data throughput and bandwidth. Throughput refers to the frequency of access to embedded memories in a given time, and bandwidth refers to the number of bits that can be read and/or written in a single cycle.

Traditional embedded memories are unable to scale up to the increased performance requirements, due to circuit and design challenges. There are multiport memories that provide multiple ports of access for a single cycle which can improve bandwidth, but traditional multiport capability has a very high area penalty, as well as power consumption penalties. Thus, multiport memories are not generally considered to increase bandwidth and throughput proportional to the penalties. Additionally, there are limitations on how fast a memory device can reliably perform a read and/or a write operation. There are typically multiple circuit elements along a read/write path, each with tolerances for how quickly it can reliably be expected to provide the expected data. Such limitations directly affect device throughput, even if bandwidth scaling can be overcome.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 5 is a block diagram of an embodiment of a high throughput register file architecture.

Figure 1:
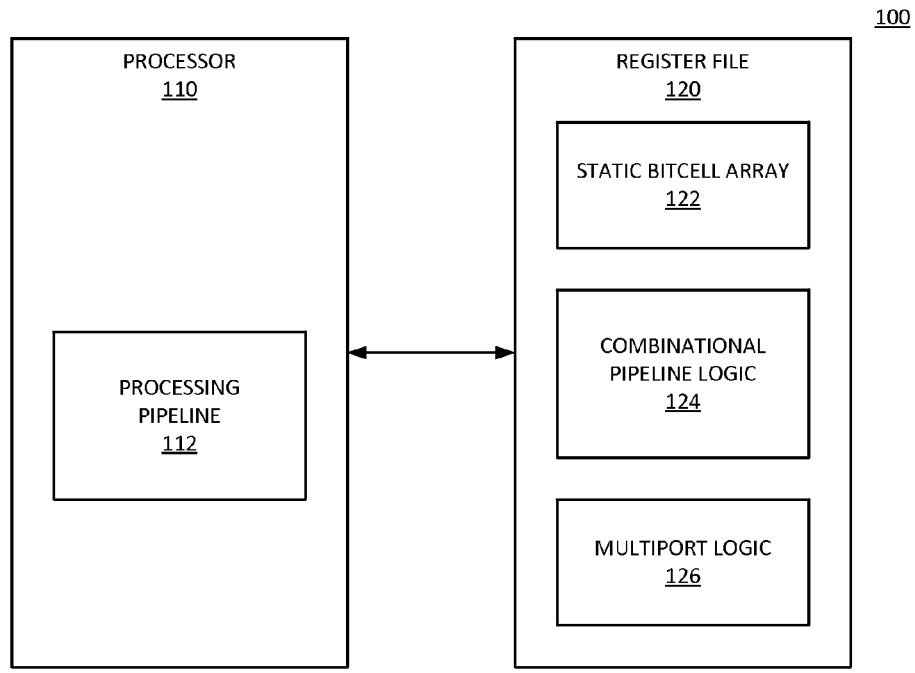
FIG. 1 is a block diagram of an embodiment of a system with pipelining in a register file memory.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, pipelining is included inside a register file memory. A register file memory device includes a static bitcell, and pipelined combinational logic. The static bitcell does not need to be refreshed, in contrast to traditional dynamic bitcell architectures that are typically used. The use of static bitcells and static combinational logic can allow the transfer of data from one pipeline stage to another and held, without having to manage the charging and discharging of the wordlines as required with dynamic architectures.

While pipelining of the memory data has been performed in previous systems, such pipelining involves entering the data returned from memory into a pipeline for use by the processors. However, such pipelining still suffers from the effects of the fact that such memory devices operate at much slower clock speeds compared to the processors, and such memory devices cannot scale up to meet demand for increased bandwidth or throughput. Pipelining within the memory device allows an increase in the number of read/write operations per unit time as compared to pipelining the results returned from a memory device.

The combinational logic pipeline couples the I/O (input/output) node to the static bitcell. The pipeline includes multiple stages, where each stage includes a static logic element and a register element, each stage transferring data through the stage in a single clock cycle. The number of stages will depend on the specific circuit design and system architecture, and can be different for a read than a write.

Simulations show that pipelined memory devices as described can operate at the same speed as traditional memories, but at a 50% power reduction. For multiport memories (such as a four port memory), simulations show both area and power reduction by 50%, which would allow the creation of multiport memories that use less power, take up less area, and have higher throughput, relative to traditional dynamic, non-pipelined memories. Pipelined memory devices or memory circuits can be incorporated or integrated on CPU (central processing unit) devices and GPU (graphic processing unit) devices, or other SoCs (system on a chip devices). Pipelined memory devices can be applied to embedded register file memories to provide power and area savings, while also providing higher performance (data throughput for memory accesses).

In one embodiment, pipelined static register file memories can operate at frequencies that are more comparable to the frequencies at which an associated processor core executes. In one embodiment, each stage in the pipeline can move data in a single clock cycle, at a higher frequency due to the more deterministic, shorter transfer from one pipeline stage to another. Thus, while data may still take several cycles relative to the clock cycles for execution by the processor, multiple elements of data will be in the pipeline at the same time, improving overall throughput.

Use of an architecture that supports pipelining within the memory device or memory circuit can enable the use of a higher frequency clock signal. In one embodiment, the memory device with pipelining is a high throughput register file (HTRF). In one embodiment, an HTRF can operate at a frequency four times (4×) what a comparable dynamic register file can operate at. Such an increase in operating frequency is not possible by conventional circuit techniques or even by process scaling. In one embodiment, a pipelined memory device can operate at a lower voltage than a comparable non-pipelined memory device.

FIG. 1 is a block diagram of an embodiment of a system with pipelining in a register file memory. System 100 provides an example of a system with a processor and a pipelined memory device. In one embodiment, register file 120 is an HTRF embedded on the same die or a same SoC as processor 110. Processor 110 represents a processing unit or device that executes operations on data stored in register file 120. In one embodiment, processor 110 is a multicore processor device, with associated register file 120. In one embodiment, processor 110 is a single core of a multicore processor, and each core has a separate associated register file 120. Processor 110 includes processing pipeline 112, commonly used in modern processors to have multiple operations executing in the processor in a pseudo-concurrent manner. Namely, processor 110 begins execution on a new operation prior to completing execution of a previously-started operation. There can be many (e.g., up to dozens) of pipeline stages in a processor.

Register file 120 includes static bitcell array 122, which is an array of static memory elements. Generally, each memory element stores a bit of data. The static nature of the memory cells or bitcells in array 122 means that the bitcells do not need to be precharged for access operations. Register file 120 includes combinational pipeline logic 124. In one embodiment, logic 124 is provided with static circuit elements, which can eliminate dynamic circuit elements from register file 120. Thus, register file 120 can be a fully static memory circuit or memory device.

For the combinational logic to be pipelined, logic 124 is subdivided as compared to traditional combinational logic. Traditional combination logic may include a series of several logic devices that will be triggered to provide a data path from a data port and the bitcell. In logic 124, one or more of the logic elements in the series are separated by a register or flip flop (or other comparable logic). Each block of logic elements and associated register or flop could be considered a separate stage. See FIG. 2 and its associated discussion for more details of one example of pipelined combinational logic.

In one embodiment, register file 120 is presented as a multiport device to processor 110. Multiport logic 126 allows register file 120 to present itself as a multiport device to processor 110. A multiport device includes multiple read and write ports that the processor can access simultaneously. Thus, a processor sees a multiport memory as a device that can take multiple requests and execute them in parallel in a single operation cycle. For example, a 2-port memory could include 2R/2W ports, which is double the bandwidth of a typical memory device.

In one embodiment, register file 120 can operate at a high enough frequency to provide virtual multiport support, without requiring the size and space penalties associated with traditional multiport memories. In one embodiment, register file 120 provides virtual multiport support by time multiplexing internal operations to receive and send data to different external connections (meaning connections that face processor 110) through a single combinational pipeline logic path. In an embodiment where register file 120 is an HTRF that operates at 4× traditional operation frequency, register file 120 could present itself as a 4 port memory to processor 110. Multiport logic 126 enables register file 120 to exchange data with multiple external connections, and multiplex its operations among the different external connections. The connections include hardware elements, registers, logic, and/or other elements to electrically interface with processor 110. Multiport logic 126 can include logic routines in control logic or control code of register file 120. The hardware elements can be or include an I/O (input/output) node, or a point at which an input can be received into register file 120 and/or an output can be sent from register file 120.

Figure 2:
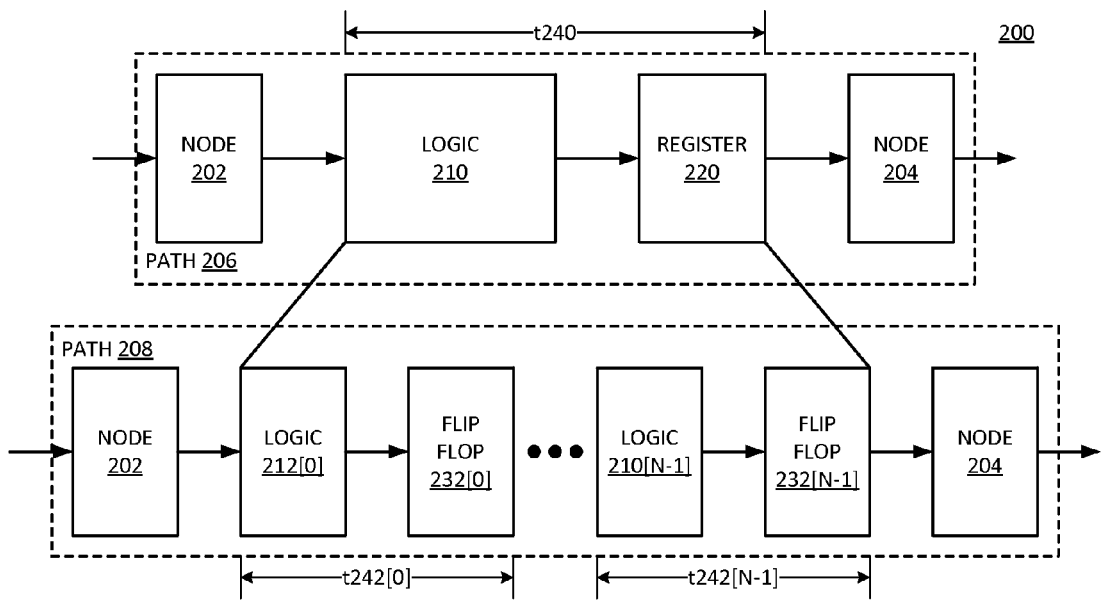
FIG. 2 is a block diagram of an embodiment of a system in which combinational logic is pipelined.

FIG. 2 is a block diagram of an embodiment of a system in which combinational logic is pipelined. Diagram 200 represents two perspectives of a combinational logic path. In one embodiment, elements of diagram 200 can represent the combinational pipeline logic 124 of system 100. In traditional non-pipelined memory devices, the memory device receives a memory access command and executes a read or a write operation based on the type of memory access command received, as illustrated by path 206. In the pipelined memory device described herein, the memory device receives a memory access command and executes multiple operations on a pipelined logic path to execute the read or write operation, as illustrated by path 208. For a read operation, node 202 can be the bitcell, and node 204 the I/O port. For a write operation, node 202 can be the I/O port, and node 204 the bitcell. The combinational logic couples the bitcell to the I/O port.

In traditional path 206, logic 210 represents all logic used to carry out the requested access command. For a read operation, logic 210 represents all read logic, and transfers the bit from node 202 to register 220. Register 220 latches the bit for sending out node 204. For a write operation, logic 210 represents all write logic, and transfers a bit to write to register 220, which then transfers the bit into node 204. Path 206 has an associated propagation time t240 for an operation. It will be understood that logic element tolerances have to be considered to provide a deterministic operation. Thus, time t240 will be the same for all devices, and represents a worst case timing for path 206. The frequency at which a memory device with path 206 executes will be based on the worst case timing t240.

Path 208 represents a pipelined logic path, where the combinational logic is subdivided. Thus, path 208 starts at node 202 and propagates data through to node 204, as with path 206, but path 208 includes multiple pipeline stages. Each stage is illustrated by a logic element 212 and an associated flip flop (or register or other logic device) 232. As illustrated, path 208 includes stage 0 (logic 212[0] and flip flop 232[0]) through stage N−1 (logic 212[N−1] and flip flop 232[N−1]). N can be any number of stages. N may be different for a read path and a write path; for example, the read path can have more stages than the write path.

Each stage of the pipeline is shown as having an associated timing, with t242[0] associated with stage 0, and t242[N−1] associated with stage N−1. In one embodiment, the time values of t242[0] and t242[N−1] are the same or substantially the same. Assume for the sake of discussion that each stage in the pipeline has an associated timing that is no greater than t242. In one embodiment, path 208 introduces a certain amount of latency (thus the sum of all t242[n] is greater than t240), but the increased latency can be tolerated due to the improvements in throughput. In one embodiment, the sum of all t242[n] is approximately equal to the value of t240. Each individual t242[n] is less than t240. Thus, path 208 can operate at a higher frequency than path 206, seeing that each stage of path 208 can complete deterministic operation in less time than what path 206 can operate at. The difference between the worst case propagation for each stage and the best case propagation for each stage of the pipeline of path 208 is significantly smaller than the difference between the worst case propagation and the best case propagation for path 206. 12.

In one embodiment, path 208 is a path of a HTRF with an associated processor device. Each pipeline stage of path 208 operates on a single cycle of a controlling clock signal (e.g., the read or write clock signal). In one embodiment, the clock signal operates at a higher frequency or higher speed than a clock speed used by an associated processor. Thus, the HTRF device can operate at a higher clock speed than a clock that controls the execution of a processor with which the HTRF is associated.

It will be understood that the number N of pipeline stages can be customizable. For example, even within the same memory device design, the designer could have the option to create, for example, a three stage pipeline or a two stage pipeline. Thus, logic 212 can include one or more logic processing elements. Each stage can have one or more logic elements 212 and a flip flop 232. The maximum depth of the pipeline that would make sense is to have a stage for each discrete logic element 212.

In one embodiment, path 208 operates clock free and precharge free. The read and/or write operations do not need clocking or precharging within the memory device. In one embodiment, all logic in path 208 is static, including the bitcell, which allows the elimination of the clock and precharge. As discussed above, the use of pipelining and static logic can allow the use of a faster clock to create more data throughput with respect to non-pipelined memory devices. Additionally, a pipelined design allows a tradeoff between saving power or using a lower operating voltage with respect to a non-pipelined design.

Figure 3A:
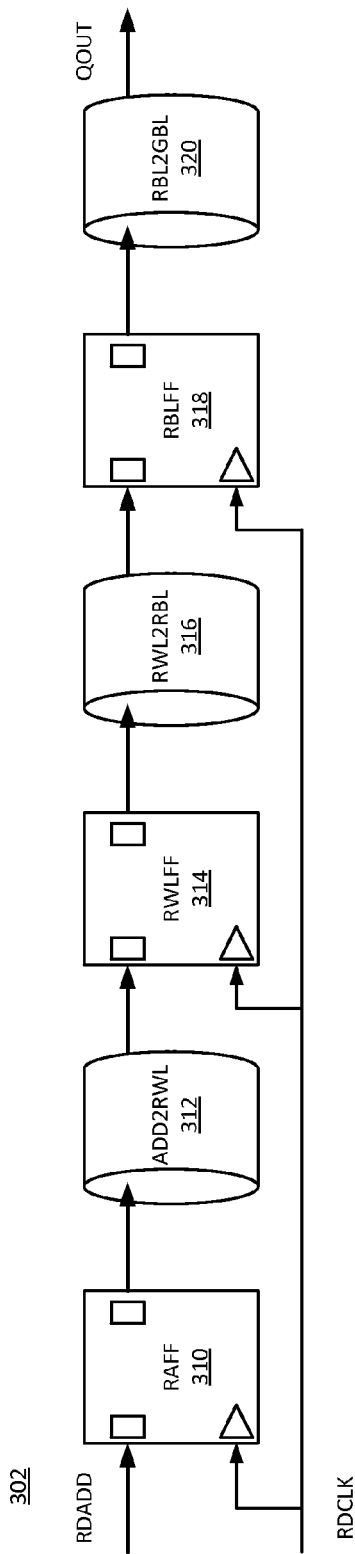
FIG. 3A is a block diagram of an embodiment of a read path in a memory with pipelining.

FIG. 3A is a block diagram of an embodiment of a read path in a memory with pipelining. Read path 302 can be one example of path 208 of FIG. 2 as a pipelined read path. Traditionally, all read logic would be sequential, and not separated by flip flops or other holding registers. Path 302 represents a circuit with flip flops between logic blocks that perform the operations to execute a read.

Read address flip flop (RAFF) 310 receives an address of a bit to read (RDADD) and triggers on a read clock (RDCLK). Thus, the address is latched into RAFF 310 on a triggering edge of the read clock. In one embodiment, there is no internal clock for path 302; rather, the logic can be triggered on the external read clock. Thus, a pipelined memory device can be designed to not have or rely on an internal clock.

RAFF 310 propagates control data into read wordline logic (ADD2RWL) 312. ADD2RWL 312 includes logic to select the wordline of the target address. Thus, ADD2RWL 312 performs logic operations to select a wordline for the read request. More specifically, selecting the line refers to triggering the read driver to activate for the read operation. ADD2RWL 312 propagates control data into read wordline flip flop (RWLFF) 314. RWLFF 314 propagates control data into read wordline to read bitline logic (RWL2RBL) 316. RWL2RBL 316 includes logic to select the bitline of the target address. Thus, RWL2RBL 316 performs logic operations to select a bitline for the read request. RWL2RBL 316 propagates control data into read bitline flip flop (RBLFF) 318. RBLFF 318 is triggered by a triggering edge of the read clock. RBLFF 318 propagates control data into read bitline to global bitline logic (RBL2GBL) 320. RBL2GBL 320 includes logic to select the global bitline to read the target bit and produce Qout, which is the bit read from the bitcell selected by the logic selections made by the logic blocks of read path 302. In one embodiment, ADD2RWL 312, RWL2RBL 316, and RBL2GBL 320 are fully static logic blocks. Thus, none of the logic would require precharging.

It will be observed that RAFF 310, RWLFF 314, and RBLFF 318 are triggered by a triggering edge of the read clock. Thus, on the triggering edge of the read clock, each flip flop transfers out to the next pipeline stage, and receives data from a previous stage or from the pipeline input. Thus, in one embodiment, it would take three read clock cycles to propagate the control along pipeline 302 to provide an output in response to the read address. Other embodiments are possible.

Figure 3B:
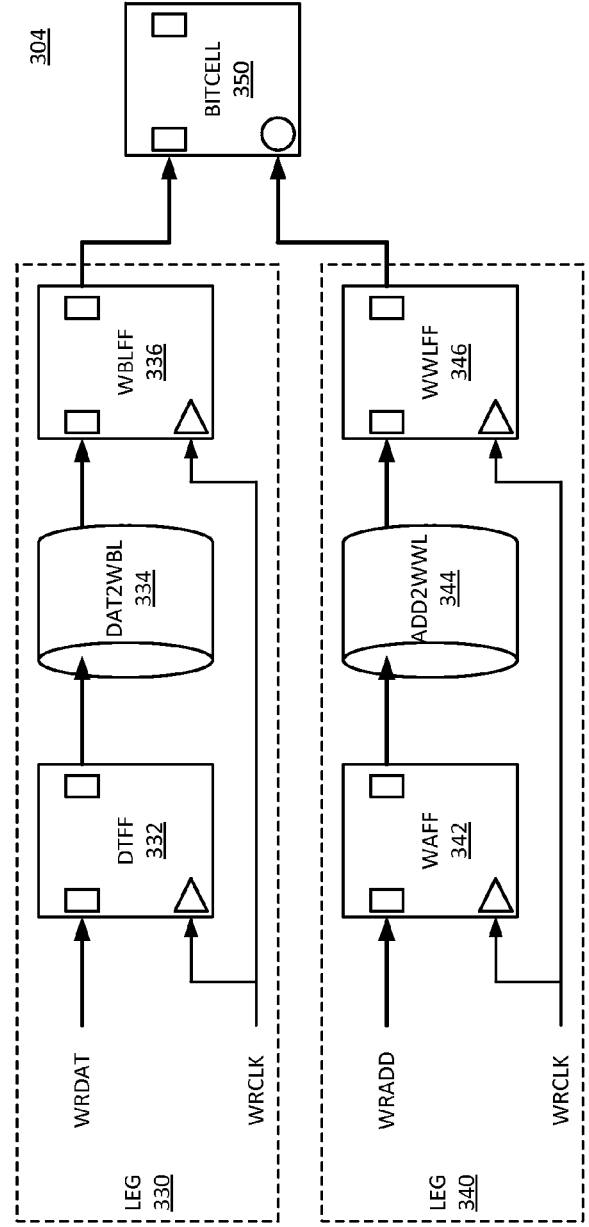
FIG. 3B is a block diagram of an embodiment of a write path in a memory with pipelining.

FIG. 3B is a block diagram of an embodiment of a write path in a memory with pipelining. Write path 304 can be one example of path 208 of FIG. 2 as a pipelined write path. Traditionally, all write logic would be sequential, and not separated by flip flops or other holding registers. Write path 304 represents a circuit with flip flops between logic blocks that perform the operations to execute a write. Write path 304 includes two separate legs: leg 330 for the data bit to write, and leg 340 for the address of the bitcell to which the data bit will be written.

On leg 330 for the data bit to write, data flip flop (DTFF) 332 receives the write data (WRDAT) and triggers on a triggering edge of the write clock (WRCLK). DTFF 332 propagates control data to data to write bitline logic (DAT2WBL) 334 to select the bitline for the write operation. More specifically, DAT2WBL 334 causes a write driver to engage for the write operation. DAT2WBL 334 propagates control data to write bitline flip flop (WBLFF) 336. WBLFF 336 triggers on the triggering edge of the write clock to provide the data bit to the selected bitcell 350.

On leg 340 for the address to write to, write address flip flop (WAFF) 342 receives the write address (WRADD) and triggers on the triggering edge of the write clock. WAFF 342 propagates control data to address to write wordline logic (ADD2WWL) 344. ADD2WWL 344 causes the write driver to engage the target wordline for the write operation. ADD2WWL 344 propagates control data to write wordline flip flop (WWLFF) 346. WWLFF 346 triggers on the triggering edge of the write clock to engage the wordline to write the data bit to the target or selected bitcell 350. In one embodiment, DAT2WBL 334 and ADD2WWL 344 are fully static logic blocks. Thus, none of the logic would require precharging.

It will be observed that DTFF 332, WBLFF 336, WAFF 342, and WWLFF 346 are triggered by a triggering edge of the write clock. Thus, on the triggering edge of the write clock, each flip flop transfers out to the next pipeline stage, and receives data from a previous stage or from the pipeline input. Thus, in one embodiment, it would take two write clock cycles to propagate along pipeline 304 to execute a write in response to the write address and data being received. Other embodiments are possible.

Figure 4B:
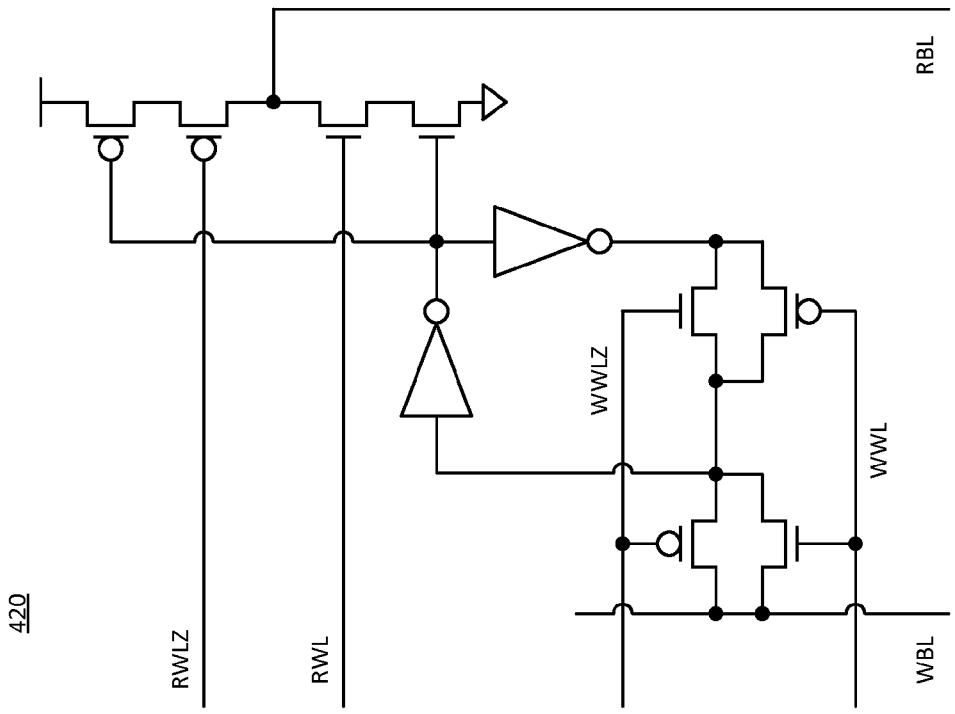
FIG. 4B is a block diagram of an embodiment of a static bitcell.
Figure 4A:
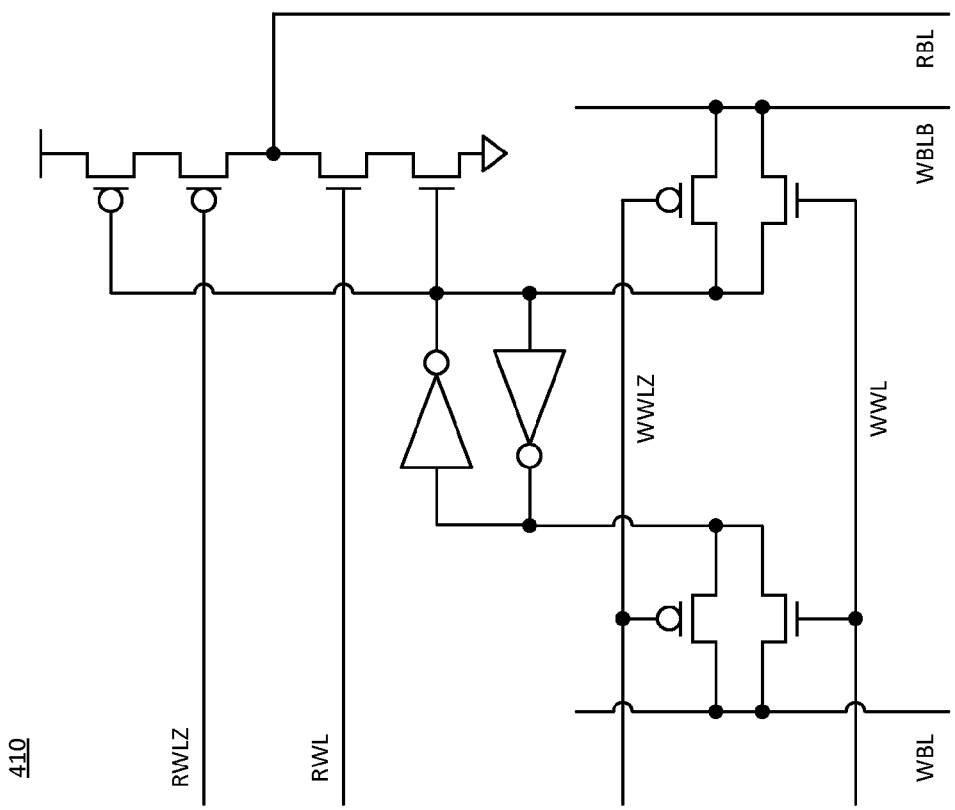
FIG. 4A is a block diagram of an embodiment of a static bitcell.

FIG. 4A is a block diagram of an embodiment of a static bitcell. Bitcell 410 can be one example of a bitcell in accordance with any embodiment described herein for a pipelined memory device. In one embodiment, the bitcell is fully static to support pipelining. Typical bitcell design for a dynamic memory cell is an 8T (eight transistor) architecture. Bitcell 410 is a 12T architecture (the eight transistors expressly illustrated, plus two each for the inverters). Traditionally, bitcells do not include p-type transistors due to limitations on area. However, newer processing technologies allow the creation of smaller p-type transistors. Thus, bitcell 410 includes both n-type and p-type transistors (e.g., NMOS and PMOS). The inclusion of the p-type transistors allows for a fully static design. Due to the higher throughput of the pipelined design, the increase in area is offset by the higher performance. Bitcell 410 is approximately 25-30% larger than a traditional dynamic bitcell.

As shown, a pair of p-type transistors connects in series to a high voltage rail. The lower p-type transistor is controlled by signal RWLZ (inverted read wordline) at its gate. A pair of n-type transistors is connected in series to the lower p-type transistor. The upper n-type transistor is controlled by signal RWL (read wordline) at its gate. The connection of the upper n-type transistor and the lower p-type transistor is the signal RBL (read bitline). The gates of the upper p-type transistor and the lower n-type transistor are tied, and coupled to the input of one of the inverters and to the output of the other inverter. The gates are also coupled to the output terminals of a differential transistor pair. The differential transistor pair includes a p-type transistor with the gate controlled by signal WWLZ (inverted write wordline), and the n-type transistor with the gate controlled by signal WWL (write wordline). The reference terminals of the differential transistor pair are coupled to signal WBLB (inverted write bitline). There is another differential transistor pair that also includes a p-type transistor with the gate controlled by signal WWLZ, and the n-type transistor with the gate controlled by signal WWL. That differential transistor pair has the reference terminals coupled to signal WBL (word bitline), and the output terminals coupled to the opposite inputs of the inverters. Thus, the inverters are coupled between the output terminals of the two pairs of differential transistors.

FIG. 4B is a block diagram of an embodiment of a static bitcell. Bitcell 420 can be one example of a bitcell in accordance with any embodiment described herein for a pipelined memory device. In one embodiment, bitcell 420 is fully static to support pipelining. Bitcell 420 is an alternative embodiment of a 12T architecture (the eight transistors expressly illustrated, plus two each for the inverters). Bitcell 420 includes both n-type and p-type transistors (e.g., NMOS and PMOS). The size and other properties of bitcell 420 should be comparable to bitcell 410.

As shown, a pair of p-type transistors connects in series to a high voltage rail. The lower p-type transistor is controlled by signal RWLZ (inverted read wordline) at its gate. A pair of n-type transistors is connected in series to the lower p-type transistor. The upper n-type transistor is controlled by signal RWL (read wordline) at its gate. The connection of the upper n-type transistor and the lower p-type transistor is the signal RBL (read bitline). The gates of the upper p-type transistor and the lower n-type transistor are tied, and coupled to the input of one of the inverters and to the output of the other inverter.

In bitcell 420, the inverter whose input is coupled to the gates of the upper p-type transistor and the lower n-type transistor has its output coupled to the reference terminals of a first differential transistor pair. In the first differential transistor pair, the n-type transistor has its gate controlled by signal WWLZ, and the p-type transistor has its gate controlled by signal WWL. The gate of the p-type transistor of the first differential transistor pair is coupled to the gate of the n-type transistor of a second differential transistor pair. The gate of the n-type transistor of the first differential transistor pair is coupled to the gate of the p-type transistor of the second differential transistor pair. The reference terminals of the second differential transistor pair are coupled to signal WBL. The output terminals of all four transistors of the two differential transistor pairs are coupled to the input of the inverter whose output is coupled to the upper p-type transistor and the lower n-type transistor and the input of the other inverter.

FIG. 5 is a block diagram of an embodiment of a high throughput register file (HTRF) architecture. HTRF 500 includes one or more HTRF bit arrays 510. Each bit array 510 includes static bitcells. In one embodiment, the bitcells in bit arrays 510 include 12T transistors such as the designs described above. Additionally, bit arrays 510 include pipelined combinational logic, such as described above. The pipelining within the bit arrays is not explicitly shown, but can be performed in accordance with any embodiment described herein.

In one embodiment, pipeline flip flops 512 and 514 interface with the pipeline paths within HTRF bit arrays 510. In one embodiment, PLFF 512 interfaces a read pipeline path to row decoder 520. In one embodiment, PLFF 514 interfaces a write pipeline path to local I/O 530. Row decoder 520 represents logic that provides a read address to the pipeline in response to a read command. Local I/O 530 represents I/O logic that can write to bit array 510. Local control (LCTRL) 540 represents other logic and circuit components that allow access to a specific associated bit array 510.

In addition to local control and local I/O for each bit array 510, the entire memory device (i.e., all bit arrays) can include global I/O 550 and global control (GCTRL) 560. The global logic (550, 560) can interface the pipelined memory device to a processor device. In one embodiment, the global logic also includes pipelined combinational logic, and it can be interfaced with pipeline flip flops. Thus, PLFF 552 can interface to global control 560, and PLFF 554 can interface with PLFF 550.

Figure 6:
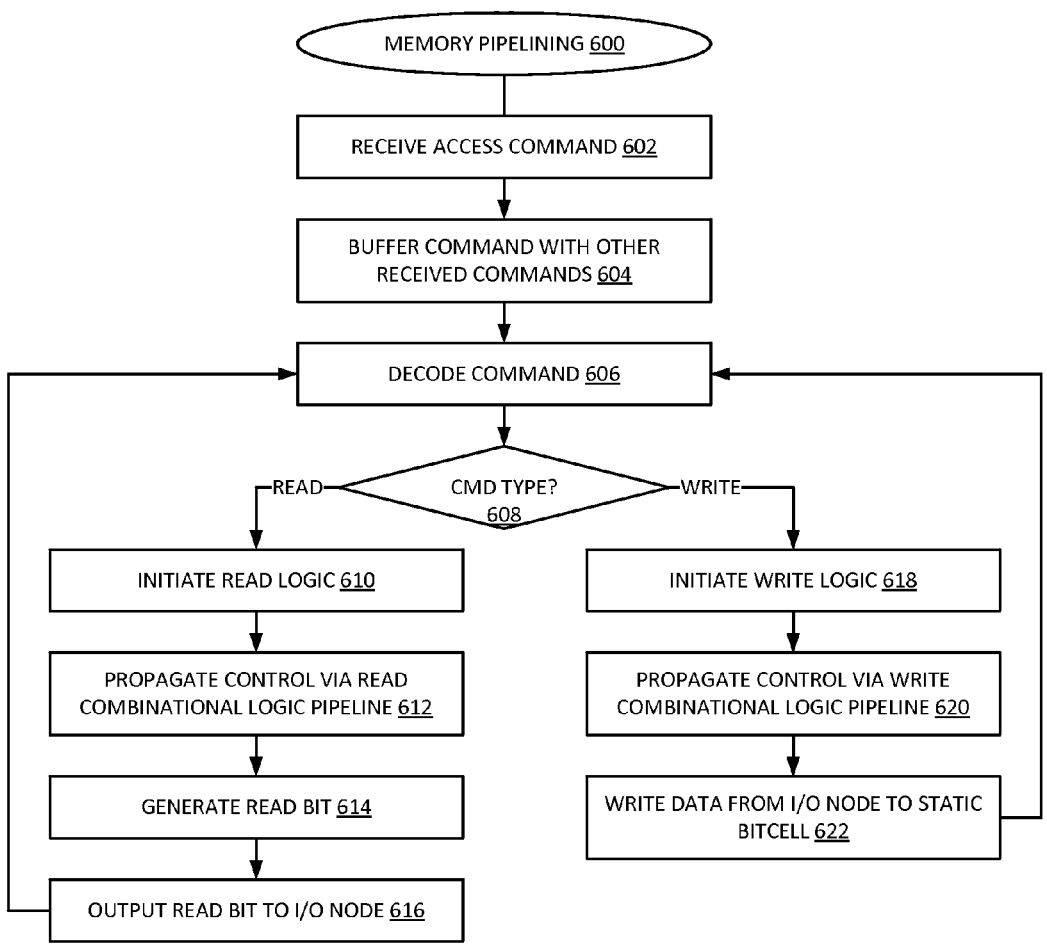
FIG. 6 is a flow diagram of an embodiment of a process for data access to a memory device with pipelining.

FIG. 6 is a flow diagram of an embodiment of a process for data access to a memory device with pipelining. Memory pipelining flow 600 can initiate when a pipelined memory device receives an access command from an associated processor or processor core, 602. Control logic in the memory device interface can buffer the access command with other received commands, 604. The control logic decodes the command to determine the type of command, the target address for the memory access, and the data for a write command, 606. Based on the command type, the control logic can provide control data to read pipeline or a write pipeline, 608.

For a read request, 608 Read branch, the control logic can initiate the read logic of the read pipeline, 610. The read pipeline propagates the control data via the read combinational logic pipeline to select the target bitcell(s), and sense the contents of the target bitcell(s), 612. The memory device generates associated read bit(s), 614, and outputs the read bit(s) to associated I/O node(s), 616.

For a write request, 608 Write branch, the control logic can initiate the write logic of the write pipeline, 618. The write pipeline propagates the control data via the write combinational logic pipeline to select the target bitcell(s), 620. The memory device writes data from the I/O node to the target static bitcell(s), 622.

Figure 7:
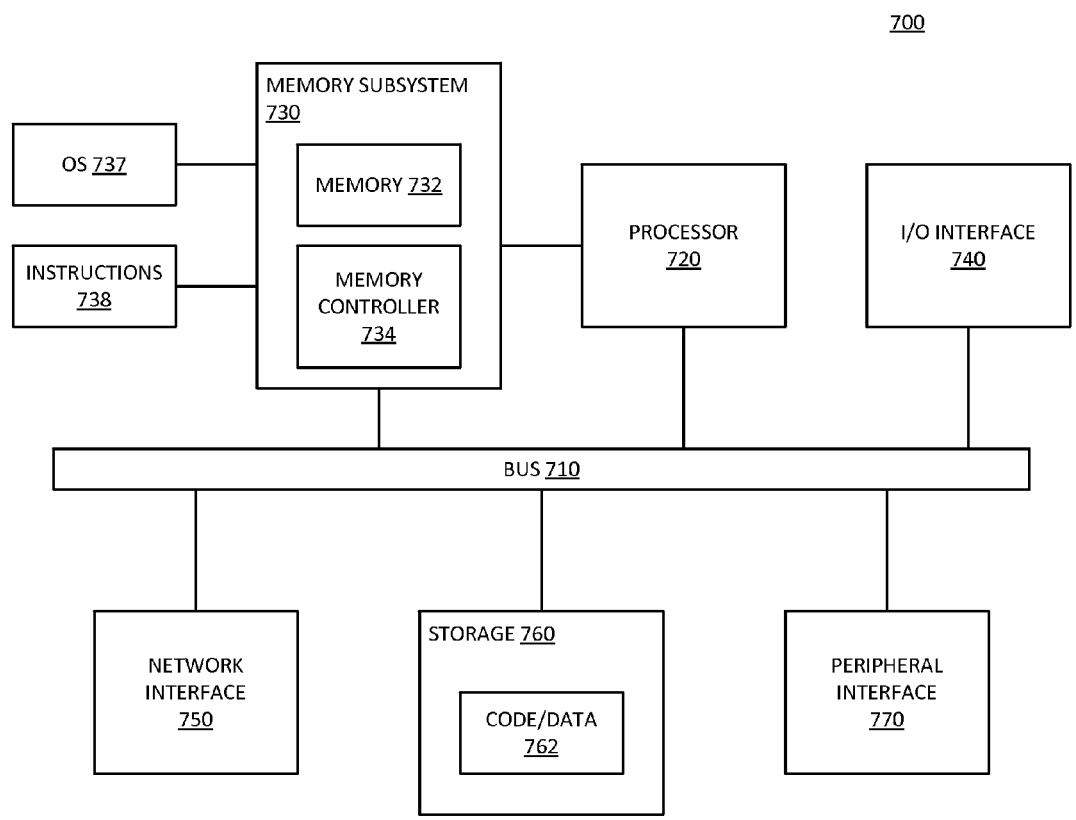
FIG. 7 is a block diagram of an embodiment of a computing system in which inter-memory pipelining can be implemented.

FIG. 7 is a block diagram of an embodiment of a computing system in which inter-memory pipelining can be implemented. System 700 represents a computing device in accordance with any embodiment described herein, and can be a laptop computer, a desktop computer, a server, a gaming or entertainment control system, a scanner, copier, printer, routing or switching device, or other electronic device. System 700 includes processor 720, which provides processing, operation management, and execution of instructions for system 700. Processor 720 can include any type of microprocessor, central processing unit (CPU), processing core, or other processing hardware to provide processing for system 700. Processor 720 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 730 represents the main memory of system 700, and provides temporary storage for code to be executed by processor 720, or data values to be used in executing a routine. Memory subsystem 730 can include one or more memory devices such as read-only memory (ROM), flash memory, one or more varieties of random access memory (RAM), or other memory devices, or a combination of such devices. Memory subsystem 730 stores and hosts, among other things, operating system (OS) 736 to provide a software platform for execution of instructions in system 700. Additionally, other instructions 738 are stored and executed from memory subsystem 730 to provide the logic and the processing of system 700. OS 736 and instructions 738 are executed by processor 720. Memory subsystem 730 includes memory device 732 where it stores data, instructions, programs, or other items. In one embodiment, memory subsystem includes memory controller 734, which is a memory controller to generate and issue commands to memory device 732. It will be understood that memory controller 734 could be a physical part of processor 720.

Processor 720 and memory subsystem 730 are coupled to bus/bus system 710. Bus 710 is an abstraction that represents any one or more separate physical buses, communication lines/interfaces, and/or point-to-point connections, connected by appropriate bridges, adapters, and/or controllers. Therefore, bus 710 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 710 can also correspond to interfaces in network interface 750.

System 700 also includes one or more input/output (I/O) interface(s) 740, network interface 750, one or more internal mass storage device(s) 760, and peripheral interface 770 coupled to bus 710. I/O interface 740 can include one or more interface components through which a user interacts with system 700 (e.g., video, audio, and/or alphanumeric interfacing). Network interface 750 provides system 700 the ability to communicate with remote devices (e.g., servers, other computing devices) over one or more networks. Network interface 750 can include an Ethernet adapter, wireless interconnection components, USB (universal serial bus), or other wired or wireless standards-based or proprietary interfaces.

Storage 760 can be or include any conventional medium for storing large amounts of data in a nonvolatile manner, such as one or more magnetic, solid state, or optical based disks, or a combination. Storage 760 holds code or instructions and data 762 in a persistent state (i.e., the value is retained despite interruption of power to system 700). Storage 760 can be generically considered to be a "memory," although memory 730 is the executing or operating memory to provide instructions to processor 720. Whereas storage 760 is nonvolatile, memory 730 can include volatile memory (i.e., the value or state of the data is indeterminate if power is interrupted to system 700).

Peripheral interface 770 can include any hardware interface not specifically mentioned above. Peripherals refer generally to devices that connect dependently to system 700. A dependent connection is one where system 700 provides the software and/or hardware platform on which operation executes, and with which a user interacts.

In one embodiment, processor 720 includes an embedded memory device or memory circuit that has pipelining in accordance with any embodiment described herein. The memory device or circuit includes one or more pipelined paths internal to the memory. Thus, the memory can operate at a higher frequency than traditional memory, and generates higher throughput. Such a memory can perform time multiplexing to interface multiple I/O ports to common pipelined read and/or write paths. The memory pipelining can pipeline the combinational logic of the memory. In one embodiment, one or more memory devices in memory subsystem 730 include pipelining as described.

Figure 8:
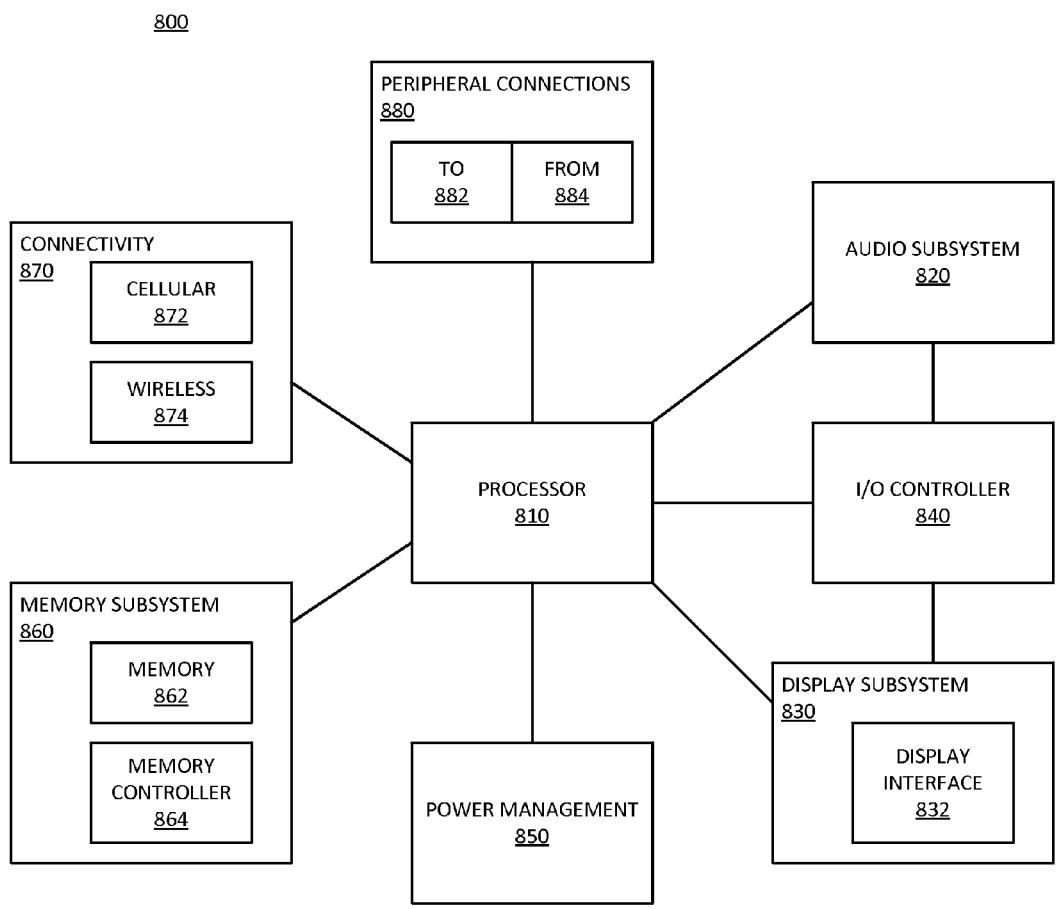
FIG. 8 is a block diagram of an embodiment of a mobile device in which inter-memory pipelining can be implemented.

FIG. 8 is a block diagram of an embodiment of a mobile device in which inter-memory pipelining can be implemented. Device 800 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 800.

Device 800 includes processor 810, which performs the primary processing operations of device 800. Processor 810 can include one or more physical devices, such as microprocessors, application processors, microcontrollers, programmable logic devices, or other processing means. The processing operations performed by processor 810 include the execution of an operating platform or operating system on which applications and/or device functions are executed. The processing operations include operations related to I/O (input/output) with a human user or with other devices, operations related to power management, and/or operations related to connecting device 800 to another device. The processing operations can also include operations related to audio I/O and/or display I/O.

In one embodiment, device 800 includes audio subsystem 820, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 800, or connected to device 800. In one embodiment, a user interacts with device 800 by providing audio commands that are received and processed by processor 810.

Display subsystem 830 represents hardware (e.g., display devices) and software (e.g., drivers) components that provide a visual and/or tactile display for a user to interact with the computing device. Display subsystem 830 includes display interface 832, which includes the particular screen or hardware device used to provide a display to a user. In one embodiment, display interface 832 includes logic separate from processor 810 to perform at least some processing related to the display. In one embodiment, display subsystem 830 includes a touchscreen device that provides both output and input to a user.

I/O controller 840 represents hardware devices and software components related to interaction with a user. I/O controller 840 can operate to manage hardware that is part of audio subsystem 820 and/or display subsystem 830. Additionally, I/O controller 840 illustrates a connection point for additional devices that connect to device 800 through which a user might interact with the system. For example, devices that can be attached to device 800 might include microphone devices, speaker or stereo systems, video systems or other display device, keyboard or keypad devices, or other I/O devices for use with specific applications such as card readers or other devices.

As mentioned above, I/O controller 840 can interact with audio subsystem 820 and/or display subsystem 830. For example, input through a microphone or other audio device can provide input or commands for one or more applications or functions of device 800. Additionally, audio output can be provided instead of or in addition to display output. In another example, if display subsystem includes a touchscreen, the display device also acts as an input device, which can be at least partially managed by I/O controller 840. There can also be additional buttons or switches on device 800 to provide I/O functions managed by I/O controller 840.

In one embodiment, I/O controller 840 manages devices such as accelerometers, cameras, light sensors or other environmental sensors, gyroscopes, global positioning system (GPS), or other hardware that can be included in device 800. The input can be part of direct user interaction, as well as providing environmental input to the system to influence its operations (such as filtering for noise, adjusting displays for brightness detection, applying a flash for a camera, or other features). In one embodiment, device 800 includes power management 850 that manages battery power usage, charging of the battery, and features related to power saving operation.

Memory subsystem 860 includes memory device(s) 862 for storing information in device 800. Memory subsystem 860 can include nonvolatile (state does not change if power to the memory device is interrupted) and/or volatile (state is indeterminate if power to the memory device is interrupted) memory devices. Memory 860 can store application data, user data, music, photos, documents, or other data, as well as system data (whether long-term or temporary) related to the execution of the applications and functions of system 800. In one embodiment, memory subsystem 860 includes memory controller 864 (which could also be considered part of the control of system 800, and could potentially be considered part of processor 810). Memory controller 864 includes a scheduler to generate and issue commands to memory device 862.

Connectivity 870 includes hardware devices (e.g., wireless and/or wired connectors and communication hardware) and software components (e.g., drivers, protocol stacks) to enable device 800 to communicate with external devices. The external device could be separate devices, such as other computing devices, wireless access points or base stations, as well as peripherals such as headsets, printers, or other devices.

Connectivity 870 can include multiple different types of connectivity. To generalize, device 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 874 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 880 include hardware interfaces and connectors, as well as software components (e.g., drivers, protocol stacks) to make peripheral connections. It will be understood that device 800 could both be a peripheral device ("to" 882) to other computing devices, as well as have peripheral devices ("from" 884) connected to it. Device 800 commonly has a "docking" connector to connect to other computing devices for purposes such as managing (e.g., downloading and/or uploading, changing, synchronizing) content on device 800. Additionally, a docking connector can allow device 800 to connect to certain peripherals that allow device 800 to control content output, for example, to audiovisual or other systems.

In addition to a proprietary docking connector or other proprietary connection hardware, device 800 can make peripheral connections 880 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, processor 810 includes an embedded memory device or memory circuit that has pipelining in accordance with any embodiment described herein. The memory device or circuit includes one or more pipelined paths internal to the memory. Thus, the memory can operate at a higher frequency than traditional memory, and generates higher throughput. Such a memory can perform time multiplexing to interface multiple I/O ports to common pipelined read and/or write paths. The memory pipelining can pipeline the combinational logic of the memory. In one embodiment, one or more memory devices in memory subsystem 860 include pipelining as described.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A register file memory device comprising:
   a static bitcell; and
   a pipeline of combinational logic circuits within the register file memory device to couple the bitcell to an input/output (I/O) node, the pipeline of combinational logic circuits including multiple stages, each stage including a static logic element and a register element, wherein each stage transfers data to a subsequent stage of the pipeline within the register file in a single clock cycle.

2. The memory device of claim 1, wherein the static bitcell comprises:
   p-type transistor devices.

3. The memory device of claim 1, wherein the static bitcell comprises:
   a twelve transistor bitcell.

4. The memory device of claim 1, wherein the register element comprises a flip flop.

5. The memory device of claim 1, wherein the register file memory device includes multiple read I/O nodes and write I/O nodes, the register file memory device further comprising:
   logic to time multiplex multiple read or write signals between the I/O nodes and the static bitcell to process multiple reads or writes as a multiport register file.

6. The memory device of claim 1, wherein each stage of the pipeline is to transfer data at a clock speed four times higher than a clock speed of a non-pipelined register file memory device.

7. An electronic device comprising:
   a register file memory device to store data, the register file memory device including
      an array of a static bitcells; and
      a pipeline of combinational logic circuits within the register file memory device to couple a selected bitcell to an input/output (I/O) node, the pipeline including multiple stages, each stage including a static logic element and a register element, wherein each stage transfers data to a subsequent stage in a single clock cycle; and
   a touchscreen display coupled to generate a display based on data accessed from the memory device.

8. The electronic device of claim 7, wherein each of the static bitcells comprises:
   p-type transistor devices.

9. The electronic device of claim 7, wherein each of the static bitcells comprises:
   a twelve transistor bitcell.

10. The electronic device of claim 7, wherein the register element comprises a flip flop.

11. The electronic device of claim 7, wherein the register file memory device includes multiple read I/O nodes and write I/O nodes, the register file memory device further comprising:
    logic to time multiplex multiple read or write signals between the multiple I/O nodes and the static bitcell to process multiple reads or writes as a multiport register file.

12. The electronic device of claim 7, wherein each stage of the pipeline is to transfer data at a clock speed four times higher than a clock speed of a non-pipelined register file memory device.

13. A method comprising:
    decoding a memory access command that addresses a bitcell of a register file memory, the bitcell being a static bitcell that has no dynamic components that need to be refreshed; and
    exchanging a data bit between the static bitcell and an input/output (I/O) node, including propagating combinational logic signals through a logic pipeline within the register file memory.

14. The method of claim 13, wherein the static bitcell comprises:
    p-type transistor devices.

15. The method of claim 13, wherein the static bitcell comprises:
    a twelve transistor bitcell.

16. The method of claim 13, wherein the register element comprises a flip flop.

17. The method of claim 13, wherein decoding the memory access command comprises decoding a read command, and wherein exchanging the data bit between the static bitcell and the I/O node comprises providing the data bit from the bitcell to the I/O node via a pipelined read path.

18. The method of claim 13, wherein decoding the memory access command comprises decoding a write command, and wherein exchanging the data bit between the static bitcell and the I/O node comprises writing the data bit from the I/O node to the bitcell via a pipelined write path.

19. The method of claim 13, wherein exchanging the data bit between the static bitcell and the I/O node comprises exchanging the data bit with multiple I/O nodes where multiple memory access commands are multiplexed via the multiple I/O nodes for processing with a single combinational logic pipeline in the register file memory.

20. The method of claim 13, wherein propagating combinational logic signals through the logic pipeline comprises propagating the combinational logic signals through each stage of the pipeline at a frequency of operation approximately equal to a clock speed of a processor device associated with the register file memory.

* * * * *